(12) United States Patent
Kinnari

(10) Patent No.: US 12,246,946 B2
(45) Date of Patent: Mar. 11, 2025

(54) SYSTEM AND A METHOD FOR DETECTING AN OUT-OF-OPERATION STATE OF AN ELEVATOR SYSTEM

(71) Applicant: KONE Corporation, Helsinki (FI)

(72) Inventor: Jouko Kinnari, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1192 days.

(21) Appl. No.: 17/063,973

(22) Filed: Oct. 6, 2020

(65) Prior Publication Data
US 2021/0155453 A1 May 27, 2021

(30) Foreign Application Priority Data
Nov. 26, 2019 (EP) .................................. 19211485

(51) Int. Cl.
| | | |
|---|---|---|
| *B66B 5/00* | (2006.01) | |
| *B66B 1/34* | (2006.01) | |
| *B66B 1/46* | (2006.01) | |
| *B66B 3/00* | (2006.01) | |
| *B66B 19/00* | (2006.01) | |
| *G01B 21/16* | (2006.01) | |
| *G01P 13/00* | (2006.01) | |
| *G06N 20/00* | (2019.01) | |

(52) U.S. Cl.
CPC .......... *B66B 5/0025* (2013.01); *B66B 1/3461* (2013.01); *B66B 1/468* (2013.01); *B66B 3/002* (2013.01); *B66B 19/007* (2013.01); *G01B 21/16* (2013.01); *G01P 13/00* (2013.01); *G06N 20/00* (2019.01); *B66B 2201/4638* (2013.01)

(58) Field of Classification Search
CPC ..... B66B 5/0025; B66B 1/3461; B66B 1/468; B66B 3/002; B66B 19/007; B66B 2201/4638; B66B 1/3423; B66B 1/3446; B66B 5/0031; B66B 5/0037; B66B 5/0087; G01B 21/16; G01P 13/00; G06N 20/00
See application file for complete search history.

(56) References Cited

U.S. PATENT DOCUMENTS

| | | | |
|---|---|---|---|
| 8,985,280 B2 * | 3/2015 | Kauppinen | B66B 1/30 187/382 |
| 2011/0315490 A1 * | 12/2011 | Shi | B66B 5/0025 187/393 |
| 2019/0210833 A1 * | 7/2019 | Laakso | B66B 5/0018 |

FOREIGN PATENT DOCUMENTS

| | | |
|---|---|---|
| EP | 3 333 110 A1 | 6/2018 |
| GB | 2 227 856 A | 8/1990 |

OTHER PUBLICATIONS

European Search Report, issued in Application No. 19 21 1485, dated Jun. 19, 2020.

\* cited by examiner

*Primary Examiner* — Sizo B Vilakazi
(74) *Attorney, Agent, or Firm* — Birch, Stewart, Kolasch & Birch, LLP

(57) ABSTRACT

A system for detecting an out-of-operation state of an elevator system includes a monitoring unit and a sensor unit. The sensor unit is configured to: detect at least one event indicating a generation of an elevator call and provide a message indicating the generation of an elevator call to the monitoring unit. The monitoring unit is configured to: initiate a time measuring function in response to receiving the message from the sensor unit, monitor a response of the elevator system to the generated elevator call. A method for detecting an out-of-operation state of an elevator system is also disclosed.

20 Claims, 7 Drawing Sheets

SYSTEM AND A METHOD FOR DETECTING AN OUT-OF-OPERATION STATE OF AN ELEVATOR SYSTEM

TECHNICAL FIELD

The invention concerns in general the technical field of elevator systems. Especially the invention concerns monitoring of condition of elevator systems.

BACKGROUND

Elevator systems may go out-of-operation, e.g. a movement of an elevator car may be stopped, due to many different reasons, such as due to technical failure, vandalism, etc. To minimize the impact of the out-of-operation of the elevator system on the passengers, a service request needs to be generated as soon as possible in order to send a maintenance technician to the site to fix the elevator system. The detection whether the elevator system has gone out-of-operation or not may be done based on data collected from the elevator system. However, it may be difficult to make an accurate detection whether the elevator system has gone out-of-operation or not, e.g. whether the elevator car is truly stopped or not.

Typically, the condition of the elevator system may be monitored by monitoring fault status and/or operating status of the elevator system directly from an elevator controller, e.g. by reading fault codes. At least one drawback of this may be that the access to monitor the fault/operating status may not be available, e.g. in case of old elevator systems and/or for parties other than manufacturer of the elevator system. Furthermore, it may not be possible to infer availability of the elevator from fault codes at high enough coverage and accuracy over all possible failure situations.

Another typical way to monitor the condition of the elevator system may be monitoring one or more outputs of the elevator system, e.g. movements of the elevator car, movements of one or more doors of the elevator system, open/closed status of one or more doors of the elevator system, vibrations, safety circuit state, elevator car stopping behavior, position of the elevator car inside the elevator shaft, and/or noise, etc., by means of a retrofitted monitoring unit with one or more add-on sensors. However, when the data is collected by the monitoring unit retrofitted to the elevator system, the accuracy of the detection may be lower than when the data is obtained directly from the elevator controller.

Thus, the main drawback of monitoring method by means of the retrofitted monitoring unit with add-on sensor(s) is inaccuracy, because it may be challenging to infer with high accuracy whether the elevator system is out-of-operation or not, which may lead to false positive alerts (which may cause cost of maintenance visit without any problems) and/or false negative alerts, i.e. missing actual failure cases because everything seems normal but elevator is failed. Moreover, at least one drawback of monitoring the outputs of the elevator system is that it only allows detections of condition of the elevator system, when the elevator car is moving and the out-of-operation situations, when the elevator car is standing at a landing cannot be distinguished from the normal operation of the elevator system, because from the monitoring unit point of view the condition of the elevator system may look normal, but the elevator system may still be out-of-operation. Even up to three out of four out-of-operation situations may be such that the elevator car is standing at a landing.

Alternatively, the condition of the elevator system may be monitored by generating remote elevator calls to one or more elevator cars when an unconventional low-usage period is identified and by monitoring response of the elevator car to the remote elevator call. If a movement of the elevator car is not detected in response to the remote elevator call, it indicates that the elevator system may be out-of-operation. However, this causes unnecessary power consumption of the elevator system, movements of the elevator in response to the remote elevator call may irritate the passengers, and this may also cause safety issues since the elevator car may be moving unexpectedly. Moreover, the possibility to generate random remote elevator calls may pose information security issues, e.g. a malicious hacker may be able to generate a huge amount of usage on the elevator system.

Thus, there is need to develop further solutions in order to improve at least partly the reliability of monitoring of condition of an elevator system.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a system and a method for detecting an out-of-operation state of an elevator system. Another objective of the invention is that the system and the method for detecting an out-of-operation state of an elevator system enables a simple way to identify out-of-operation state of the elevator system by monitoring elevator call giving attempts.

The objectives of the invention are reached by a system and a method as defined by the respective independent claims.

According to a first aspect, a system for detecting an out-of-operation state of an elevator system is provided, wherein the system comprises: a monitoring unit for monitoring one or more operations of the elevator system and a sensor unit arranged in a vicinity of a landing call device and configured to: detect at least one event indicating a generation of an elevator call and provide a message indicating the generation of an elevator call to the monitoring unit; and wherein the monitoring unit is configured to: initiate a time measuring function in response to receiving the message from the sensor unit, and monitor a response of the elevator system to the generated elevator call.

The monitoring unit may further be configured to generate at least one signal indicating an out-of-operation state of the elevator system to an external computing entity in response to a detection that the elevator system is not responding to the generated elevator call in an expected manner during a predefined delay time after initiating the time measuring function.

Alternatively, the monitoring unit may further be configured to provide the monitored response to the external computing entity, and the external computing entity may be configured to generate an indication that the elevator system is out-of-operation, in response to a detection that the elevator system is not responding to the generated elevator call in an expected manner during a predefined delay time after initiating the time measuring function.

The sensor unit may comprise a first sensor device for detecting a first event indicating the generation of an elevator call within a detection zone of the first sensor device, wherein the first event may be one of the following: motion of an object, gesture of an object, a change in a distance between the sensor unit and a nearest detected object.

The sensor unit may further comprise a second sensor device for detecting a second event within a detection zone of the second sensor device before detection of the first event by the first sensor device, wherein the second event may be a motion of an object or a gesture of an object.

Furthermore, the sensor unit may be configured to wake up from a sleep mode in response to a detection of the second event by the second sensor device and to initiate a monitoring mode of the first sensor device for a predefined monitoring period.

Moreover, if the first event is the change in a distance between the sensor unit and a nearest detected object, the message may further comprise shortest detected distance between the sensor unit and a nearest detected object, wherein the monitoring unit may be configured to initiate the time measuring function, if the received distance corresponds substantially to a reference distance range representing a distance between the sensor unit and the landing call device.

The reference distance range may be adjusted by the monitoring unit by means of a continuous learning during the operation of the system or the reference distance range may be predefined.

The message may be provided to the monitoring unit in response to the detection of the at least one event indicating the generation of an elevator call or after a predefined monitoring period has elapsed.

The sensor unit may be retrofitted to an existing elevator system and independent of the existing elevator system, and/or the monitoring unit may be retrofitted to an existing elevator system and independent of the existing elevator system.

According to a second aspect, a method for detecting an out-of-operation state of an elevator system is provided, wherein the method comprises: detecting, by a sensor unit arranged in a vicinity of a landing call device, at least one event indicating a generation of an elevator call; providing, by the sensor unit, a message indicating the generation of an elevator call to a monitoring unit; initiating, by the monitoring unit, a time measuring function in response to receiving the message from the sensor unit; and monitoring a response of the elevator system to the generated elevator call.

The method may further comprise generating, by the monitoring device, at least one signal indicating an out-of-operation state of the elevator system to an external computing entity in response to a detection that the elevator system is not responding to the generated elevator call in an expected manner during a predefined delay time after initiating the time measuring function.

Alternatively, the method may further comprise: providing, by the monitoring unit, the monitored response to an external computing entity for detecting an out-of-operation state of an elevator system; and generating, by the external computing entity, an indication that the elevator system is out-of-operation, in response to a detection that the elevator system is not responding to the generated elevator call in an expected manner during a predefined delay time after initiating the time measuring function.

The sensor unit may comprise a first sensor device for detecting a first event indicating the generation of an elevator call within a detection zone of the first sensor device, wherein the first event may be one of the following: motion of an object, gesture of an object, a change in a distance between the sensor unit and a nearest detected object.

The sensor unit may further comprise a second sensor device for detecting a second event within a detection zone of the second sensor device before detection of the first event by the first sensor device, wherein the second event may be a motion of an object or a gesture of an object.

The method may further comprise waking up the sensor unit from a sleep mode in response to a detection of the second event by the second sensor device and initiating a monitoring mode of the first sensor device for a predefined monitoring period.

Moreover, if the detected first event is the change in a distance between the sensor unit and a nearest detected object, the message may further comprise shortest detected distance between the sensor unit and a nearest detected object, wherein the method may further comprise initiating, by the monitoring unit, the time measuring function, if the received distance corresponds substantially to a reference distance range representing a distance between the sensor unit and the landing call device.

The reference distance range may be adjusted by the monitoring unit by means of a continuous learning during the operation of the system or the reference distance range may be predefined.

The message may be provided to the monitoring unit in response to the detection of the at least one event indicating the generation of an elevator call or after a predefined monitoring period has elapsed.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
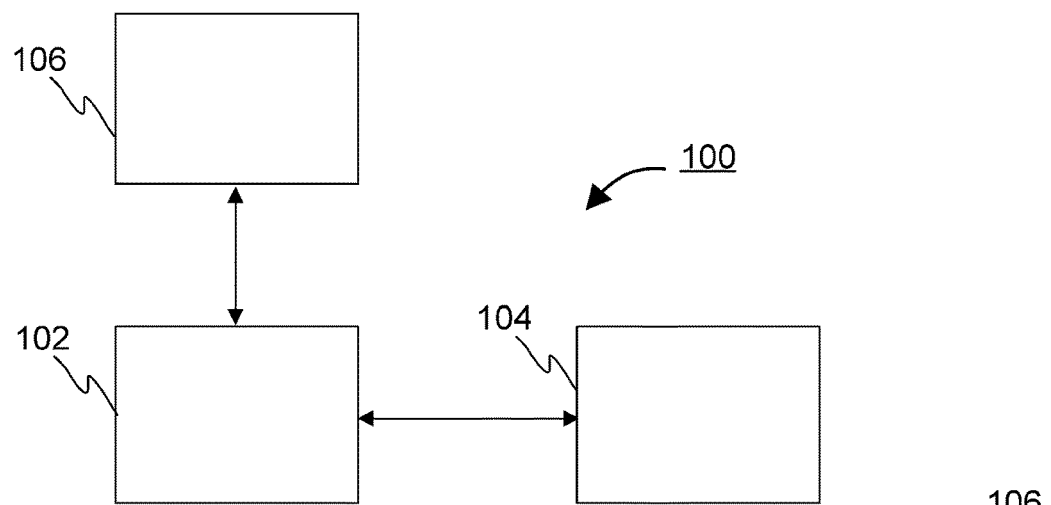
FIG. 1 illustrates schematically a simple example of a system according to the invention.

FIG. 1 illustrates schematically a simple example of a system 100 according to the invention for detecting an out-of-operation state of an elevator system. With the term "out-of-operation state of the elevator system", i.e. out-of-service state of the elevator system, is meant throughout this application any condition of the elevator system, wherein the elevator system is not able to serve its purpose, i.e. the elevator car is not able to serve elevator call(s) generated for said elevator car, e.g. the movement of the elevator car is stopped. The out-of-operation state may be caused e.g. by technical failure, vandalism, etc. The system 100 comprises a monitoring unit 102 for monitoring one or more operations of the elevator system 200, and a sensor unit 104 comprising sensor device(s). The system 100 may further comprise an external computing entity 106. The monitoring unit 102 and the sensor unit 104 are communicatively coupled to each other. The communication between the monitoring unit 102 and the sensor unit 104 may be based on any known wireless technologies. Preferably, the communication between the monitoring unit 102 and the sensor unit 104 may be based on one or more medium-range wireless radio frequency technologies, e.g. sub-gigahertz frequency technologies, in order to enable long distance communication through concrete walls and/or floors. One example of the sub-gigahertz frequency technology may be LoRa (Long Range). However, the invention is not limited to that and any other sub-gigahertz frequency technologies may be used.

The external computing entity 106 may be one of the following: a cloud server, a service center, a data center. The external entity herein means an entity that locates separate from the elevator system 200. The implementation of the external computing entity 106 may be done as a stand-alone entity or as a distributed computing environment between a plurality of stand-alone devices, such as a plurality of servers providing distributed computing resource. The monitoring unit 102 and the external computing entity 106 are communicatively coupled to each other. The communication between the monitoring unit 102 and the external computing unit 106 may be based on one or more known communication technologies, either wired or wireless.

Figure 2:
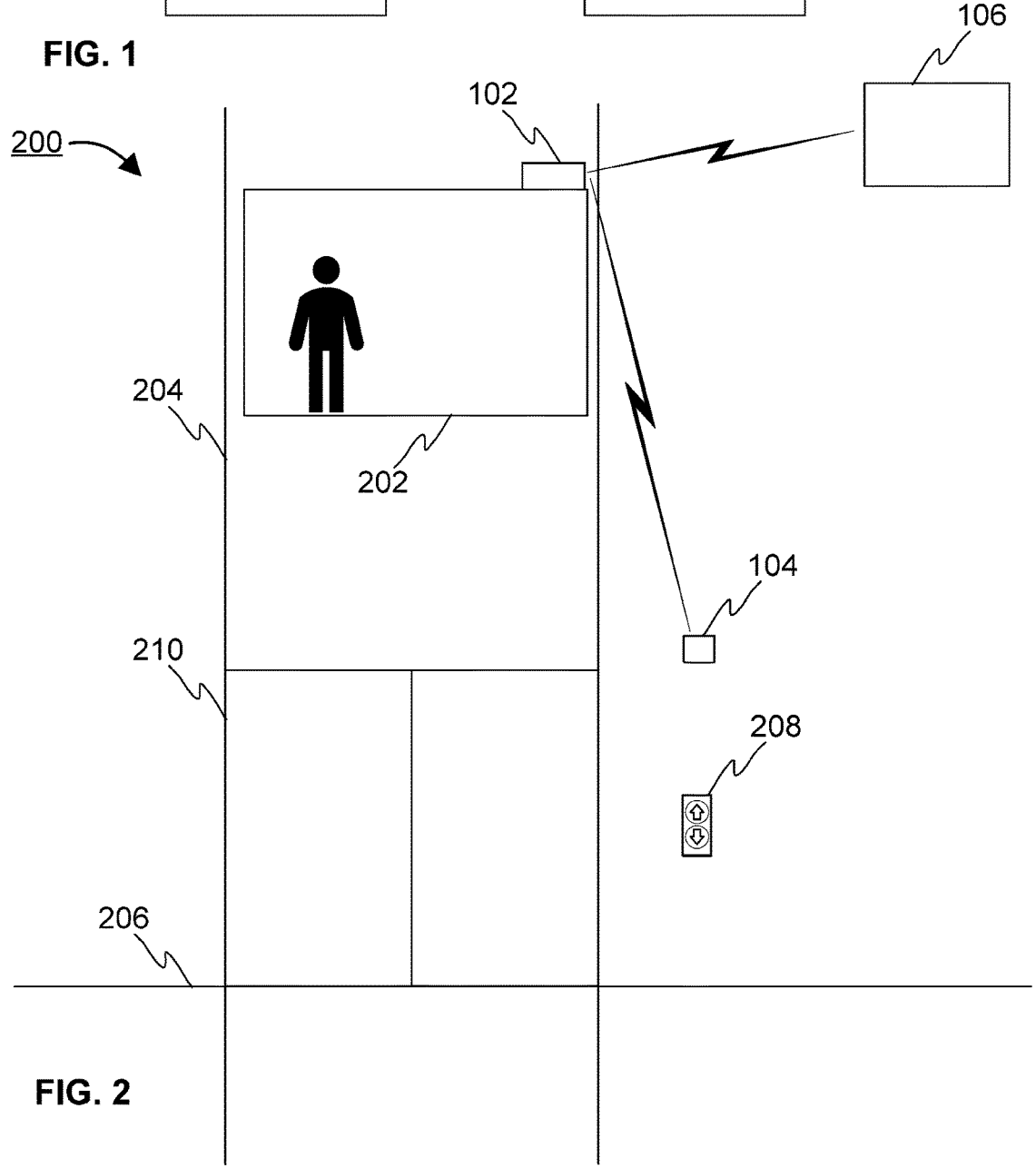
FIG. 2 illustrates schematically an example elevator environment wherein the embodiments of the invention may be implemented.

FIG. 2 illustrates schematically an example elevator environment wherein the embodiments of the invention may be implemented as will be described. The example elevator environment illustrated in FIG. 2 is an elevator system 200, which may comprise an elevator control system for controlling the operation of the elevator system 200, an elevator car 202, and a hoisting machine configured to drive the elevator car 202 along an elevator shaft 204 between landings 206. For sake of clarity the elevator control system and the hoisting machine are not illustrated in FIG. 2. Each landing 206 comprises a landing door 210. In the example elevator environment 200 of FIG. 2 the monitoring unit 102 is arranged to the elevator car 202 travelling inside the elevator shaft 204 between the landings 206. However, the physical location of the monitoring unit 102 in the elevator system 200 is not limited. In FIG. 2 only a part of the elevator shaft 204 comprising one landing 206 is illustrated, but the elevator shaft 204 may comprise any number of landings. In the example elevator environment 200 of FIG. 2 the sensor unit 102 is arranged in a vicinity of a landing call device 208 residing in said landing 206. The sensor unit 104 may be arranged to any landing 206 of the elevator system 200. Preferably, the sensor unit 104 may be arranged to the landing 206 having the main entrance. The system 100 may further comprise more than one sensor unit 104 arranged to one or more other landings 206 in order to monitor condition of the elevator system 200 from more than one landing 206 of the elevator system 200.

The landing call device 208, e.g. a landing call panel, comprise one or more elevator user interface buttons, e.g. elevator landing call button, for generating an elevator call, e.g. a landing call, in order to control at least one operation of the elevator system, e.g. for moving the elevator car 202 to a desired landing 206. The generated elevator call may comprise information of the landing 206 from which the elevator call is generated. Furthermore, the elevator call may comprise information of the direction, i.e. upwards or downwards, to which elevator car 202 is desired to travel.

The sensor unit 104 is configured to detect at least one event indicating a generation of an elevator call, e.g. a landing call. In other words, a detection of the at least one event by the sensor unit 104 indicates that a user, e.g. a passenger, is assumed to give the elevator call or is attempting to give the elevator call via the landing call device 208, e.g. by pushing or touching one or more buttons of the landing call device 208. The sensor unit 104 according to the invention is not configured to control the operation of the elevator system 200. The actual elevator call generated via the landing call device 208 is provided to the elevator control system, which is configured to control the operation of the elevator system 200. The sensor unit 104 according to the invention is configured to indicate the generation of elevator call by detecting at least one event indicating the generation of the elevator call for detecting an out-of-operation state of the elevator system 200. In response to the detection of the at least one event indicating the generation of the elevator call, the sensor unit 104 is configured to provide a message indicating the generation of the elevator call to the monitoring unit 102. Alternatively, the sensor unit 104 may be configured to provide the message indicating the generation of an elevator call to the monitoring unit 102 after a predefined monitoring period has elapsed and at least one event indicating the generation of an elevator call is detected during said monitoring period. The predefined monitoring period may be a fixed duration, e.g. between 30 to 45 seconds. The sensor unit 104 may be configured to be in a monitoring mode for the predefined monitoring period during which the sensor device(s) of the sensor unit 104 are configured to monitor, i.e. measure, in order to detect the event indicating the generation of the elevator call. Providing of the message from the sensor unit 104 to the monitoring unit 102 only if the at least one event is detected minimizes radio transmissions, i.e. the communication, from the sensor unit 104 to the monitoring unit 102, which in turn reduces power consumption of the sensor unit 104.

The monitoring unit 102 is configured to initiate a time measuring function in response to receiving the message from the sensor unit 104. The time measuring function comprises determining, i.e. counting or measuring, time elapsed from the assumed generation of the elevator call via the landing call device 208. The time measuring function may be performed by a timer or any other entity of the monitoring unit 102. After initiating the time measuring function the monitoring unit 102 is configured to monitor a response of the elevator system 200 to the generated elevator call.

According to an embodiment of the invention, in response to a detection that the elevator system 200 is not responding to the generated elevator call in an expected manner during a predefined delay time after initiating the time measuring function, the monitoring unit 102 may be configured to generate at least one signal indicating an out-of-operation state of the elevator system 200 to the external computing entity 106. The response of the elevator system 200 to the generated elevator call in the expected manner may be that the elevator car 202 arrives at the desired landing 206, i.e. the landing 206 in which the landing call device 208 resides from which the elevator call is generated. In other words, if the monitoring unit 102 detects that the elevator car 202 has not arrived at the desired landing 206, i.e. the landing 206 in which the landing call device 208 resides from which the elevator call is generated, when the predefined delay time has elapsed after initiating the time measuring function, the monitoring unit 102 may be configured to generate the at least one signal indicating an out-of-operation state of the elevator system 200 to the external computing entity 106. The monitoring unit 102 may comprise one or more sensor devices, e.g. accelerometer and/or magnetometer, for detecting the position of the elevator car 202 inside the elevator shaft 204 in order to detect whether the elevator car 202 has arrived at the desired landing 206. The monitoring unit 102 may further comprise one or more other sensor devices, e.g. gyroscope inclinometer, pressure sensor, temperature sensor, microphone, current sensor, etc., for detecting at least one operation of the elevator system 200 and/or for providing operational data of the elevator system 200. In response to receiving the at least one signal indicating the out-of-operation state of the elevator system 200, the external computing entity 106 may be configured to generate an indication that the elevator system 200 is out of operation to instruct a maintenance personnel to fix, i.e. repair, the elevator system 200, for example.

According to an embodiment of the invention, the monitoring unit 102 may be configured to provide the monitored response of the elevator system 200 to the external computing entity 106. The external computing entity 106 may then be configured to generate an indication that the elevator system 200 is out-of-operation, e.g. to instruct a maintenance personnel to fix, i.e. repair, the elevator system 200, in response to a detection that the elevator system 200 is not responding to the generated elevator call in the expected manner during the predefined delay time after initiating the time measuring function. In other words, if the external computing entity 106 detects from the monitored response received from the monitoring unit 102 that the elevator car 202 has not arrived at the desired landing 206, i.e. the landing 206 in which the landing call device 208 resides from which the elevator call is generated, when the predefined delay time has elapsed after initiating the time measuring function, the external computing entity may be configured to generate the indication that the elevator system 200 is out-of-operation.

The detection that the elevator system 200 is not responding to the generated elevator call in the expected manner during the predefined delay time indicates that the elevator system 200 is in the out-of-operation state. The predefined delay time may be defined based on a typical response time of the elevator system 200, e.g. a typical waiting time of the elevator car 202 to arrive said landing 206. The delay time may depend e.g. on the number of landings 206 of the elevator system 200 and/or typical utilization rate of the elevator system 200. The delay time may be e.g. between 30 to 45 seconds.

The invention enables that the repair of the elevator system 200 may be expedited in order to improve the availability of the elevator system 200, i.e. the time that elevator system 200 is in operation. According to an example, the out-of-operation indication may be provided directly from the external computing entity 106 to a mobile terminal, e.g. mobile phone or tablet computer, of the maintenance personnel.

According to an embodiment of the invention, the sensor unit 104 may comprise a first sensor device 302a for detecting a first event indicating the generation of an elevator call within a detection zone 304a of said first sensor device 302a. According to another embodiment, the sensor unit 104 may further comprise a second sensor device 302b for detecting a second event within a detection zone 304b of the second sensor device 302b before detection of the first event by the first sensor device. As discussed above the sensor unit 104 is arranged in the vicinity of the landing call device 208, which means that the sensor unit 104 is arranged so that the detection zone 304a, 304b of the sensor device 302a, 302b extends, i.e. covers, at least the landing call device 208. Preferably, the sensor unit 104 may be arranged above the landing call device 208 so that the detection zone 304a, 304b of the sensor device 302a, 302b is directed substantially downwards towards the landing call device 208 is illustrated in FIGS. 3A-3B and 4A-4C.

The detection zone 304a, 304b of the sensor device 302a, 302b may be defined by a field of view (FOV) of the sensor device 302a, 302b. The FOV of the sensor device 302a, 302b defines the angle through which the sensor device 302a, 302b may receive electromagnetic radiation. The shape of the FOV of the sensor device 302a, 302b may be e.g. conical, rectangle or any other shape. The size of the detection zone 304a, 304b of the sensor device 302a, 302b may be defined so that the size of the detection zone 304a, 304b is as small as possible in order to avoid faulty detections, but so that it still covers at least the call giving device 208 in order to avoid missing detections.

Figure 3A:
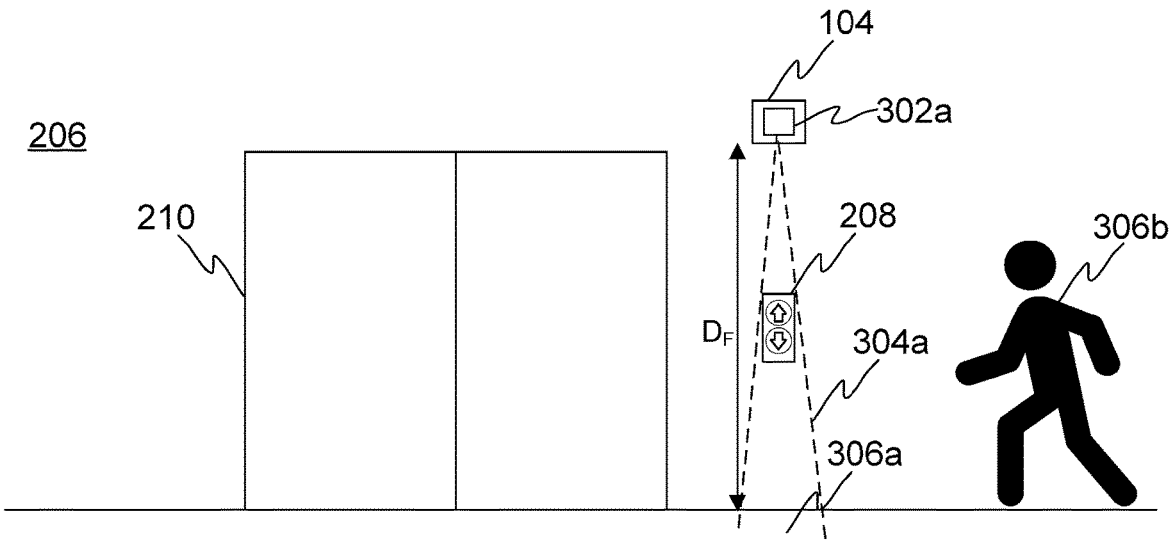
FIGS. 3A and 3B illustrate an example embodiment of the invention, wherein the sensor unit comprises one sensor device.
Figure 3B:
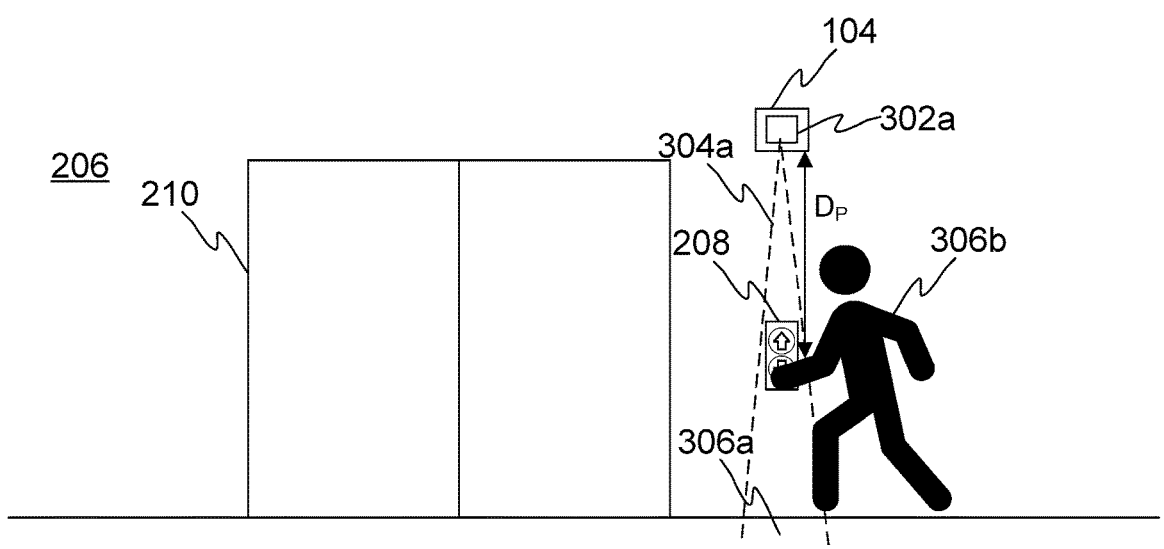

FIGS. 3A and 3B illustrate an example operation of the system according to the invention, wherein the sensor unit 104 comprises the first sensor device 302a for detecting the first event indicating the generation of an elevator call within the detection zone 304a of said first sensor device 302a. In other words, the sensor unit 104 of the example of FIGS. 3A and 3B comprises only the first sensor device 302a for detecting one event, i.e. the first event, indicating the generation of an elevator call within the detection zone 304a of said first sensor device 302a. This enables a simple configuration of the sensor unit 104. The first sensor device 302a may comprise a motion sensor, i.e. occupancy sensor, e.g. a passive infrared sensor (PIR), for detecting an event being a motion of an object 306a, 306b. Alternatively, the first sensor device 302a may comprise a gesture sensor, e.g. infrared based gesture sensor, for detecting an event being a gesture of an object 306a, 306b. Alternatively, the first sensor device 302a may comprise a distance sensor, e.g. a proximity sensor, for detecting an event being a change in a distance between the sensor unit 104 and a nearest detected object 306a, 306b. Alternatively, the first sensor device 302a may comprise a thermal imaging sensor or an optical imaging device, e.g. a camera, for detecting an event being a motion of an object 306a, 306b. The object may be a passenger 306b, who is attempting to give the elevator call via the landing call device 208, e.g. by pushing or touching one or more buttons of the landing call device 208.

The sensor unit 104 may be powered by one or more batteries, capacitors, or solar cells in order to avoid cumbersome powering from mains. However, this may limit the power available for the components of the sensor unit 104. Different type sensor devices may have different power consumption characteristics. Typically, the distance sensors, e.g. proximity sensors, consume more power than the motion sensors. For example, the motion sensors may consume e.g. approximately 1 microampere at 3 volts and the distance sensors, e.g. proximity sensors, may consume e.g. approximately few milliamperes at 3 volts. Thus, from the power consumption point of view, the use of the motion sensor as the first sensor device 302*a* instead of the proximity sensor, may be preferable. However, the different type sensor devices may also have different sized detection zones 304*a*, 304*b*. Typically, the motion sensors may have significantly wider detection zone 304*a*, 304*b* than the distance sensors, e.g. proximity sensors. Thus, from the detection accuracy point of view, the use of the proximity sensor may be preferable, because motion sensors may not be sufficiently accurate to detect whether the elevator call was generated by the passenger via the landing call device or not. It may be possible that someone only passes by the landing call device 208 without making the landing call, but when he passes by the landing call device 208, he passes through the detection zone 304*a*, 304*b* of the motion sensor causing a false detection of motion within the detection zone 304*a*, 304*b*.

In the example situation of FIG. 3A a passenger is not within the detection zone of the first sensor device 302*a* causing that none of the above disclosed events is detected by the first sensor device 302*a*. In example situation of FIG. 3B a passenger 306*b* has arrived within the detection zone 304*a* of the first sensor device 302*a* causing that the first sensor device 302*a* detects at least one of the above disclosed events depending on the used sensor device 302*a*. The sensor unit 104 is configured to provide a message indicating the generation of the elevator call to the monitoring unit 102 and the monitoring unit 102 is configured to initiate the time measuring function in response to receiving the message from the sensor unit 104 as discussed above. After initiating the time measuring function the monitoring unit 102 is configured to monitor the response of the elevator system 200 to the generated elevator call. In response to a detection that the elevator system 200 is not responding to the generated elevator call in an expected manner during the predefined delay time after initiating the time measuring function, the monitoring unit 102 may be configured to generate the at least one signal indicating an out-of-operation state of the elevator system 200 to the external computing entity 106 as discussed above. Alternatively, the monitoring unit 102 may be configured to provide the monitored response of the elevator system 200 to the external computing entity 106 and the external computing entity 106 may be configured to generate an indication that the elevator system 200 is out-of-operation, in response to the detection that the elevator system 200 is not responding to the generated elevator call in the expected manner during the predefined delay time after initiating the time measuring function as discussed above.

If the first event detected by the first sensor device 302*a* is the change in a distance between the sensor unit 104 and a nearest detected object 306*a*, 306*b*, the message may further comprise shortest detected distance between the sensor unit 104 and the nearest detected object 306*a*, 306*b*.

In the example situation of FIG. 3A the passenger 306*b* is not within the detection zone 304*a* of the first sensor device 302*a* causing that the floor 306*a* at the landing 206 is the nearest object to the sensor unit 104 and the distance between the sensor unit 104 and the nearest object 306*a*, 306*b* that the first sensor device 302*a* detects is the distance $D_F$ between the sensor unit 104 and the floor 306*a*.

In the example situation of FIG. 3B a passenger 306*b* has arrived within the detection zone 304*a* of the first sensor device 302*a* causing that the first sensor device 302*a* detects a change, e.g. reduction, in the distance between the between the sensor unit 104 and the nearest detected object 306*a*, 306*b*. In this case the passenger 306*b* is the nearest object to the sensor unit 104 and the distance between the sensor unit 104 and the nearest object 306*a*, 306*b* that the first sensor device 302*a* detects is the distance $D_P$ between the sensor unit 104 and the passenger 306*b*. Thus, in this case the shortest detected distance between the sensor unit 104 and the nearest detected object 306*a*, 306*b* is the distance $D_P$ between the sensor unit 104 and the passenger 306*b*. The change in the distance between the sensor unit 104 and the nearest detected object indicates that the elevator call is generated or at least the passenger 306*b*, is in the vicinity of the landing call device 208 attempting to give the elevator call via the landing call device 208.

The monitoring unit 102 may be configured to initiate the time measuring function, if the received distance corresponds substantially to a reference distance range representing a distance between the sensor unit 104 and the landing call device 208, i.e. the received distance is substantially within the reference distance range. After initiating the time measuring function the monitoring unit 102 is configured to monitor the response of the elevator system 200 to the generated elevator call. In response to a detection that the elevator system 200 is not responding to the generated elevator call in an expected manner during the predefined delay time after initiating the time measuring function, the monitoring unit 102 may be configured to generate the at least one signal indicating an out-of-operation state of the elevator system 200 to the external computing entity 106 as discussed above. Alternatively, the monitoring unit 102 may be configured to provide the monitored response of the elevator system 200 to the external computing entity 106 and the external computing entity 106 may be configured to generate an indication that the elevator system 200 is out-of-operation, in response to the detection that the elevator system 200 is not responding to the generated elevator call in the expected manner during the predefined delay time after initiating the time measuring function as discussed above.

The reference distance range may be defined throughout this application as a distance range corresponding substantially the distance between the sensor unit 104 and the landing call device 208. The reference distance range may be defined to be e.g. from the distance between the sensor unit 104 and a first horizontal edge of the landing call device 208 being closest to the sensor unit 104, e.g. upper edge of the landing call device 208, to the distance between the sensor unit 104 and a second horizontal edge of the landing call device 208 being furthermost from the sensor unit 104, e.g. lower edge of the landing call device. The reference distance range may be adjusted by the monitoring unit 102 by applying continuous learning during the operation of the system 100. In other words, the monitoring unit 104 may utilize the detected distances to adjust the reference distance range to learn the distance that corresponds to the distance from the sensor unit 104 to the landing call device 208 versus the distance from the sensor unit 104 to the floor 306a. Alternatively, the reference distance range may be pre-defined during provisioning of the sensor unit 104.

When the detected distance is within the reference distance range, it indicates that a user e.g. the passenger 306a, attempts to give the elevator call via the landing call device 208, e.g. by pushing or touching one or more buttons of the landing call device 208, which causes the reduction, i.e. change, of the detected distance between the sensor unit 104 and the nearest object 306a, 306b.

Figure 4A:
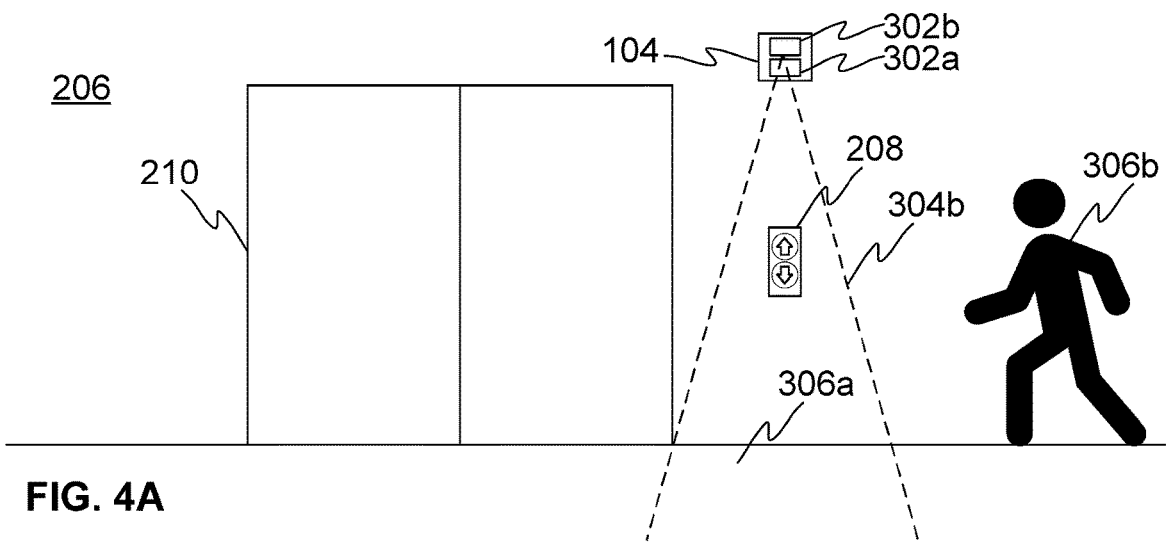
FIGS. 4A-4C illustrate another example embodiment of the invention, wherein the sensor unit comprises two sensor devices.
Figure 4B:
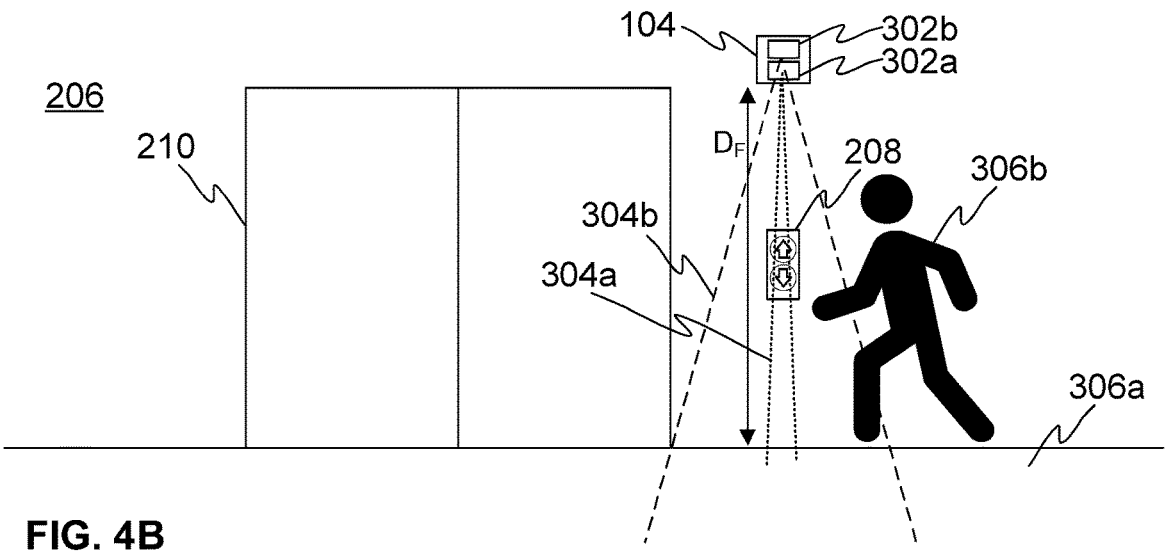
Figure 4C:
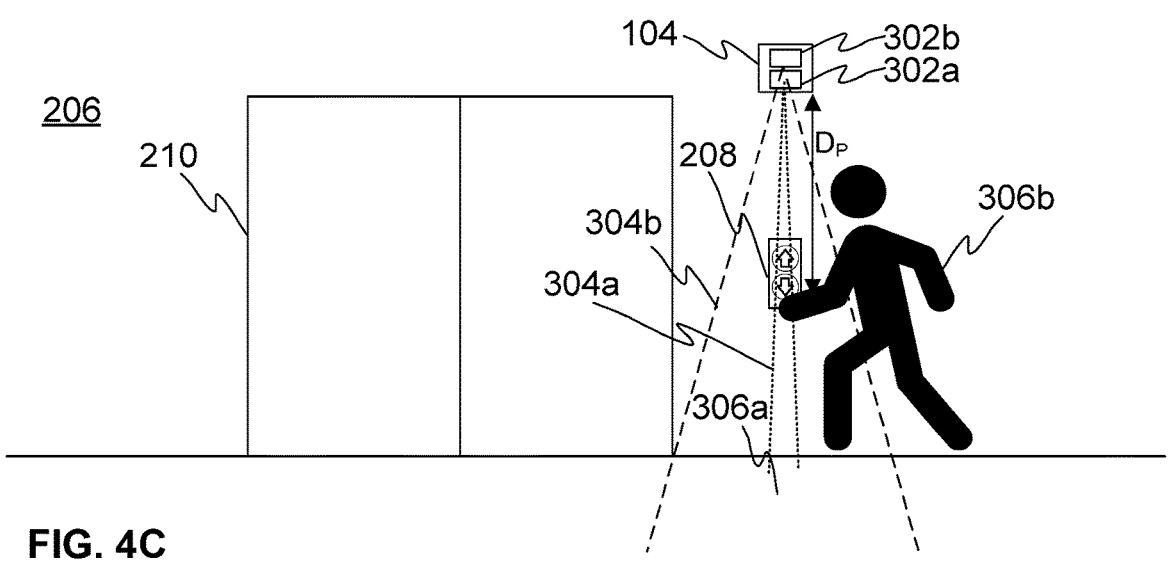

FIGS. 4A-4C illustrate another example operation of the system according to the invention, wherein the sensor unit 104 comprises further the second sensor device 302b for detecting the second event within the detection zone 304b of the second sensor device 302b before detection of the first event by the first sensor device 302a. In other words, the sensor unit 104 of the example of FIGS. 4A-4C comprises the second sensor device 302b for detecting the second event within the detection zone 304b of the second sensor device 302b before detection of the first event by the first sensor device 302a and the first sensor device 302a for detecting the first event within the detection zone 304a of the first sensor device 302a. The second detection zone 304b may be wider, i.e. broader, than the first detection zone 304a. The use of two sensor devices 302a, 302b having different size detection zones 304a, 304b improves the accuracy of the detection of the generation of the elevator call. In the examples of FIGS. 4A-4C, the first sensor device 302a and the second sensor device 302b are arranged inside a single unit, i.e. the sensor unit 104. However, this is just one embodiment of the invention and at least one of the first sensor device 302a and the second sensor device 302b may be implemented as external sensor device arranged, i.e. located, physically separately from the sensor unit 104.

The sensor unit 104 may be powered by one or more batteries, capacitors, or solar cells in order to avoid cumbersome powering from mains. However, this may limit the power available for the components of the sensor unit 104. Thus, in order to avoid need for large sized and weighed batteries, the sensor unit 104 may be configured to be mainly in a sleep mode.

The sensor unit 104 may be configured to wake up from a sleep mode in response to a detection of the second event by the second sensor device 302b. In the sleep mode the sensor unit 104 with the exception of the second sensor device 302b may be arranged in a low power consumption mode or may be turned off. This means that the sensor unit 104 is mainly in the sleep mode and waits for an interrupt signal from the second sensor device 302b indicating the detection of the second event by the second sensor device 302b. This allows a reduced power consumption of the full, i.e. whole, sensor unit 104. As discussed above, different type sensor devices may have different power consumptions. Typically, the distance sensors, e.g. proximity sensors, consume more power than motion sensors. For example, the motion sensors, e.g. a passive infrared sensor (PIR), may consume e.g. approximately 1 microampere at 3 volts and the distance sensors, e.g. proximity sensors, may consume e.g. approximately few milliamperes at 3 volts. Thus, it may be preferable to use a motion sensor as the second sensor device 302b and a distance sensor, e.g. proximity sensor, as the first sensor device 302a. This enables very low power consumption, i.e. power consumption of the motion sensor, during the sleep mode of the sensor unit 104. Moreover, as discussed above, the different type sensor devices may also have different sized detection zones 304. Typically, the motion sensors may have significantly wider detection zone 304a, 304b than the distance sensors, e.g. proximity sensors. Thus, from the detection accuracy point of view, the use of the proximity sensor as the first sensor device 302a may be preferable. According to a non-limiting example the FOV of the proximity sensor may be approximately 10 degrees by 10 degrees conical FOV from a receiver of the proximity sensor. The FOV of the motion sensor may be such that the motion sensor is configured to detect an object closer than approximately one meter to the landing call device 208. Alternatively, a gesture sensor, e.g. infrared based gesture sensor; thermal imaging sensor; or optical imaging device, e.g. a camera, may be used as the second sensor device 302b. For example, in a simple example implementation of the invention a generic landing area camera arranged to image the landing area may be used as the second sensor device 302b and the generic landing are camera may be used to detect the second event in order to wake up the rest of the sensor unit 104 including the first sensor device 302a.

In the example situation of FIG. 4A a passenger 306b is not within the detection zone 304b of the second sensor device 302b. Thus, the sensor unit 104 is in the sleep mode waiting for the interrupt signal from the second sensor device 302b. In the example situation of FIG. 4B, a passenger 306b has arrived within the detection zone 304b of the second sensor device 302b, i.e. the second sensor device 302b detects a second event within the first detection zone 304b. In response to the detection of the second event by the second sensor device 302b, the sensor unit 104 is configured to wake up from the sleep mode. Depending on the type of the second sensor device 302b the second event may be e.g. motion or gesture an object within the detection zone 304b of the second sensor device 302b.

After the sensor unit 104 is waked up, the sensor unit 104 may be configured to initiate a monitoring mode of the first sensor device 302a for a predefined monitoring period. The predefined monitoring period may be a fixed duration, e.g. 30 seconds or longer, if the second sensor device 302b continues to detect the second event within the second detection zone 304b after the waking up the sensor unit 104. During the monitoring period the first sensor device 302a is configured to monitor, i.e. measure, in order to detect the first event within the first detection zone 304a.

In the next chapters the invention is described by using a distance sensor, e.g. a proximity sensor, as the first sensor device 302a. However, the invention is not limited to that and any other type of sensor device, e.g. a gesture sensor, e.g. infrared based gesture sensor; thermal imaging sensor; or optical imaging device, e.g. a camera, may be used as the first sensor device 302a. In response to detecting the first event indicating a generation of an elevator call by the first sensor device 302a within the detection zone 304a of the first sensor device 302a, the sensor unit 104 is configured to provide the message indicating the generation of the elevator call to the monitoring unit 104, which is configured to initiate the time measuring function in response to receiving the message from the sensor unit 102. After providing the message to the monitoring unit 102, the sensor unit 104 goes back to the sleep mode.

After initiating the time measuring function the monitoring unit 102 is further configured to monitor the response of the elevator system 200 to the generated elevator call. In response to a detection that the elevator system 200 is not responding to the generated elevator call in an expected manner during the predefined delay time after initiating the time measuring function, the monitoring unit 102 may be configured to generate the at least one signal indicating an out-of-operation state of the elevator system 200 to the external computing entity 106 as discussed above. Alternatively, the monitoring unit 102 may be configured to provide the monitored response of the elevator system 200 to the external computing entity 106 and the external computing entity 106 may be configured to generate an indication that the elevator system 200 is out-of-operation, in response to the detection that the elevator system 200 is not responding to the generated elevator call in the expected manner during the predefined delay time after initiating the time measuring function.

When the first sensor device 302a is a distance sensor, the first event is a distance between the sensor unit 104 and a nearest detected object within the detection zone 304a of the first sensor device 302a and the message indicating the generation of an elevator call provided to the monitoring unit 102 may further comprise shortest detected distance between the sensor unit 104 and the nearest detected object 306a, 306b. After providing the message to the monitoring unit 102, the sensor unit 104 goes back to the sleep mode.

In the example situation of FIG. 4B, the passenger is within the detection zone 304b of the second sensor device 302b, but not within the detection zone 304a of the first sensor device 302a. Thus, the floor 306a of the landing 206 is the nearest object 306a, 306b to the sensor unit 104 and the distance between the sensor unit 104 and the nearest object 306a, 306b that the first sensor device 302a detects is the distance $D_F$ between the sensor unit 104 and the floor 306a.

In the example situation of FIG. 4C, the passenger 306b is within the detection zone 304a of the first sensor device 302a causing that the first sensor device 302a detects a change, e.g. reduction, in the distance between the between the sensor unit 104 and the nearest detected object 306a, 306b. In this case the passenger 306b is the nearest detected object to the sensor unit 104 and the distance between the sensor unit 104 and the nearest object 306a, 306b that the first sensor device 302a detects is the distance $D_P$ between the sensor unit 104 and the passenger 306b. Thus, in this case during the predefined monitoring period the shortest detected distance between the sensor unit 104 and the nearest detected object 306a, 306b is the distance $D_P$ between the sensor unit 104 and the passenger 306b. The change in the distance between the sensor unit 104 and the nearest detected object indicates that the elevator call is generated or at least the passenger 306b is in the vicinity of the landing call device 208 attempting to give the elevator call via the landing call device 208.

The monitoring unit 102 may be configured to initiate the time measuring function, only if the received distance, i.e. the shortest detected distance, corresponds substantially to the reference distance range representing a distance between the sensor unit 104 and the landing call device 208, i.e. the received distance is substantially within the reference distance range as discussed above. After initiating the time measuring function the monitoring unit 102 may further be configured to monitor the response of the elevator system 200 to the generated elevator call. In response to the detection that the elevator system 200 is not responding to the generated elevator call in an expected manner during the predefined delay time after initiating the time measuring function, the monitoring unit 102 may be configured to generate the at least one signal indicating an out-of-operation state of the elevator system 200 to the external computing entity 106 as discussed above. Alternatively, the monitoring unit 102 may be configured to provide the monitored response of the elevator system 200 to the external computing entity 106 and the external computing entity 106 may be configured to generate an indication that the elevator system 200 is out-of-operation, in response to the detection that the elevator system 200 is not responding to the generated elevator call in the expected manner during the predefined delay time after initiating the time measuring function as discussed above.

Figure 5A:
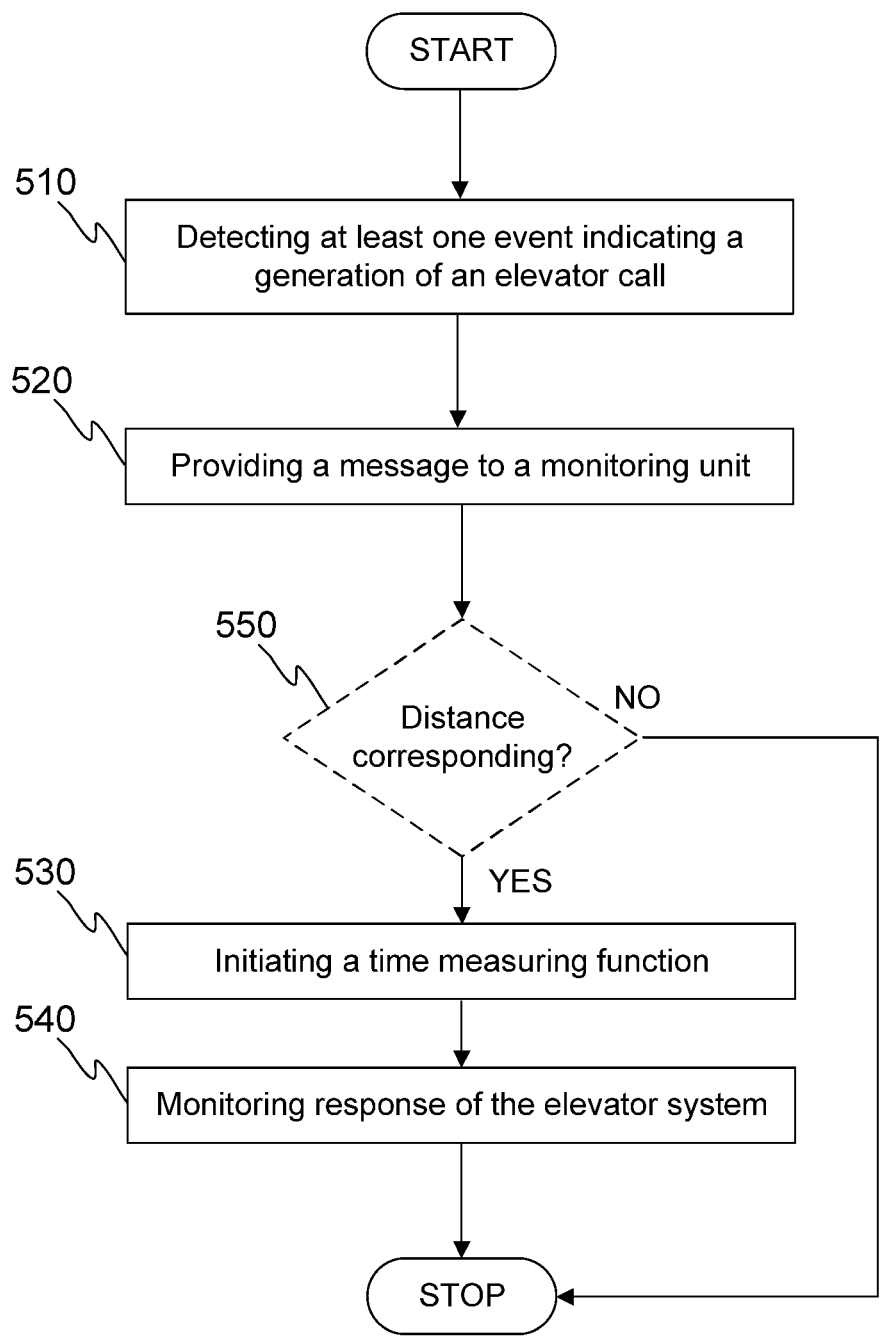
FIG. 5A illustrates schematically an example of a method according to the invention.

Above the invention is described relating to the system 100 according to the invention. Next an example of a method for detecting an out-of-operation state of an elevator system according to the invention is described by referring to FIG. 5, which illustrates schematically the invention as a flow chart. At the step 510, the sensor unit 104 detects at least one event indicating a generation of an elevator call. At the step 520, the sensor unit 104 provides a message indicating the generation of an elevator call to the monitoring unit 102. The message may be provided to the monitoring unit 102 in response to the detection of the at least one event indicating the generation of an elevator call. Alternatively, the sensor unit 104 may provide the message to the monitoring unit 102 after a predefined monitoring period has elapsed. The predefined monitoring period may be a fixed duration, e.g. between 30 to 45 seconds. The sensor unit 104 may be in a monitoring mode for the predefined monitoring period during which the sensor device(s) of the sensor unit 104 are configured to monitor, i.e. measure, in order to detect the at least one event. At the step 530, the monitoring unit 102 initiates a time measuring function in response to receiving the message from the sensor unit 104. At the step 540, the monitoring unit 102 monitors the response of the elevator system 200 to the generated elevator call.

As discussed above relating to the system 100, the sensor unit 104 may comprise the first sensor device 302a for detecting a first event indicating the generation of an elevator call within the detection zone 304a of the first sensor device 302a at the step 510. The first event that may be detected with the first sensor device 302a may be one of the following: motion of an object, gesture of an object, a change in a distance between the sensor unit and a nearest detected object.

Figure 5B:
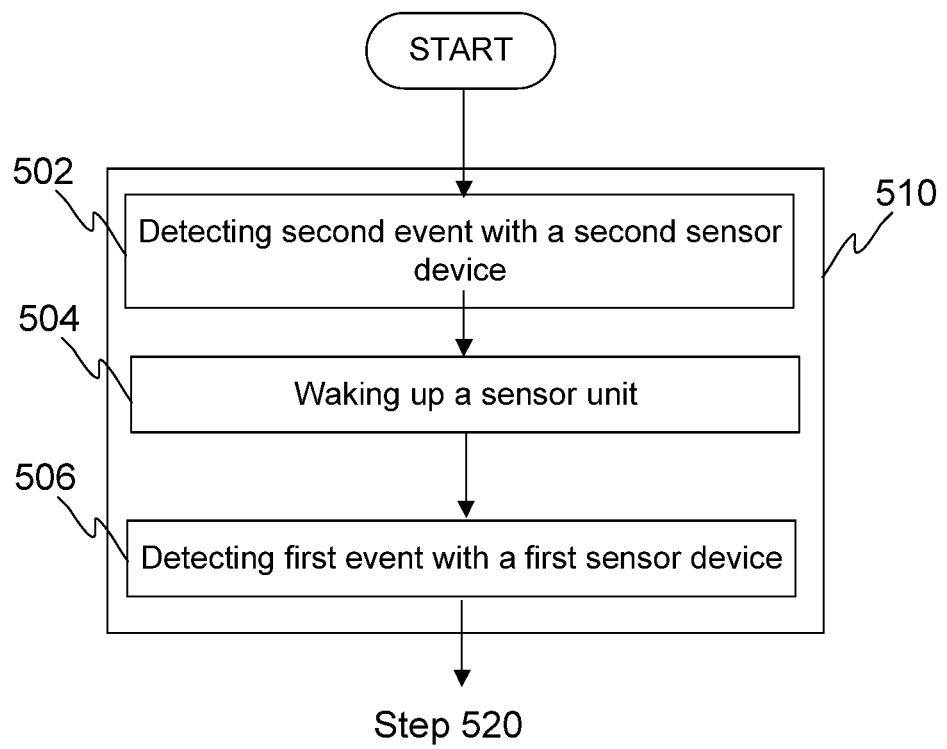
FIG. 5B illustrates schematically another example of a method according to the invention.

Furthermore, as also discussed above relating to the system 100, the sensor unit 104 may further comprise the second sensor device 302b for detecting the second event within the detection zone 304b of the second sensor device 302b before detection of the first event by the first sensor device 302a. FIG. 5B illustrates schematically an example of a method according to the invention, wherein the step 510 of detecting the at least one event comprises detecting first the second event within the detection zone 304b of the second sensor device 302b and then detecting the first event within the detection zone 304a of the first sensor device 302a. At the step 504, the sensor unit 104 wakes up from a sleep mode and initiates a monitoring mode of the first sensor device 302a for the predefined monitoring period in response to the detection of the second event by the second sensor device 302b at the step 502. The second event may be motion or gesture of the object within the detection zone 304b of the second sensor device 302b.

In response to the detection of the first event at the step 506, wherein the first event indicates a generation of an elevator call by the first sensor device 302a within the detection zone 304a of the first sensor device 302a, the sensor unit 104 continues to the step 520 as discussed above and provides the message indicating the generation of an elevator call to the monitoring unit 102, which is initiates at the step 530 the time measuring function in response to receiving the message. After providing the message to the monitoring unit 102, the sensor unit 104 goes back to the sleep mode.

If the first event is a change in a distance between the sensor unit 104 and a nearest detected object 306a, 306b within the detection zone 304a of the first sensor device 302a, the message may comprise shortest detected distance between the sensor unit 104 and the nearest detected object and the method may comprise initiating, by the monitoring unit 102, at the step 530 the time measuring function, only if the received distance corresponds substantially to the reference distance range representing a distance between the sensor unit 104 and the landing call device 208. This is illustrated with the optional step 550 in FIG. 5A. After providing the message to the monitoring unit 102, the sensor unit 104 goes back to the sleep mode. After the initiating step 530 the method continues as described above.

Figure 6A:
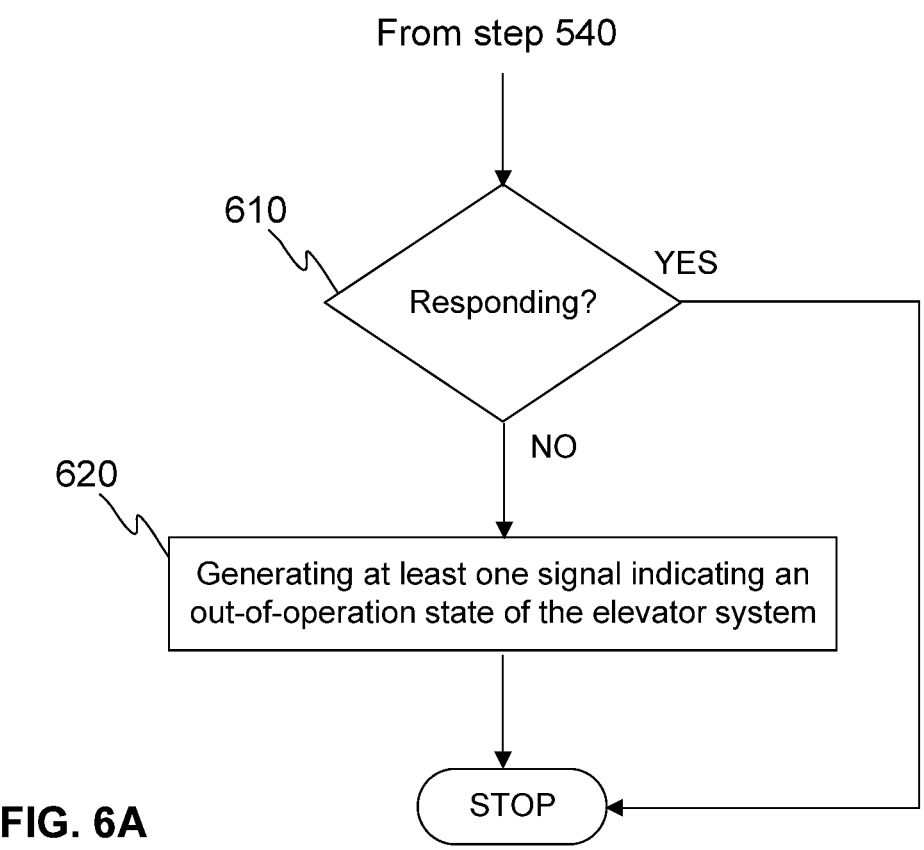
FIG. 6A illustrates schematically another example of a method according to the invention.
Figure 6B:
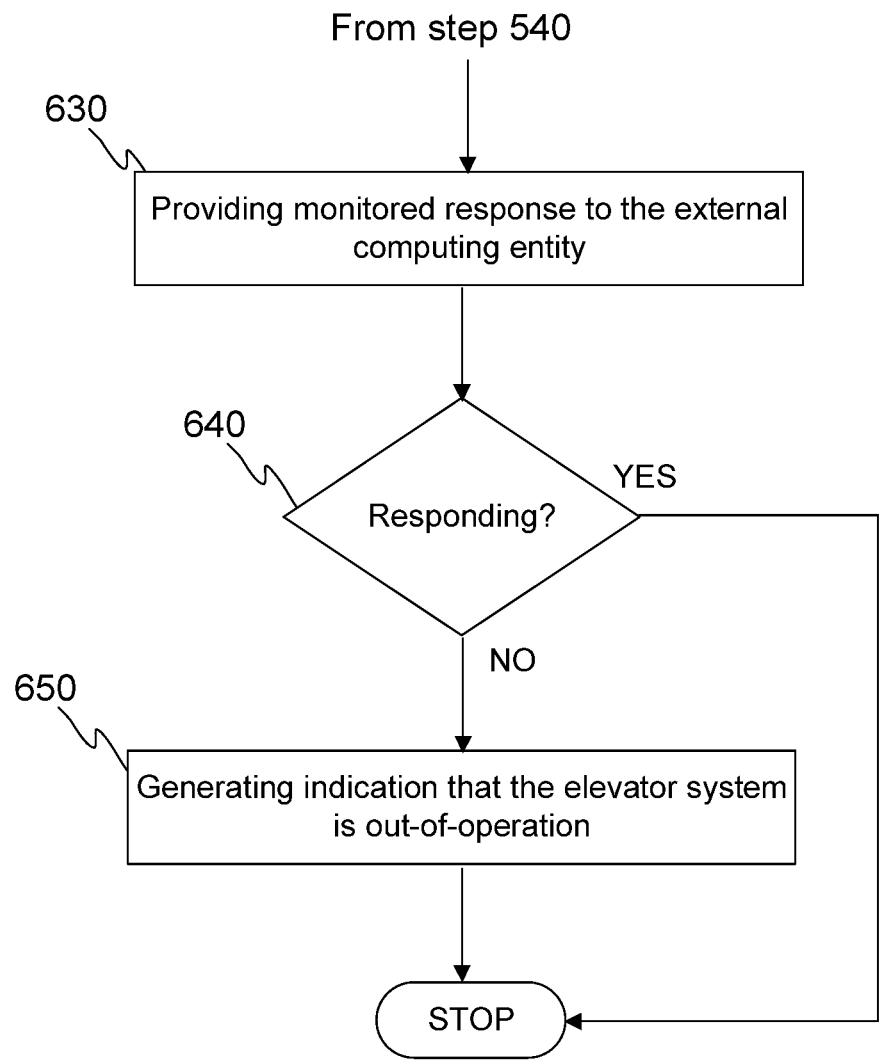
FIG. 6B illustrates schematically another example of a method according to the invention.

Next another example of the method according to the invention is described by referring to FIGS. 6A and 6B illustrating further embodiments of the invention. In the example of FIG. 6A, after the step 530 described above at the step 620, the monitoring unit 102 may generate the at least one signal indicating an out-of-operation state of the elevator system to the external computing entity 106 in response to a detection 610 that the elevator system 200 is not responding to the generated elevator call in an expected manner during a predefined delay time after initiating the time measuring function as discussed above. The response of the elevator system 200 to the generated elevator call in the expected manner may be that the elevator car 202 arrives at the desired landing 206, i.e. the landing 206 in which the landing call device 208 resides from which the elevator call is generated. In other words, if the monitoring unit 102 detects at the step 610 that the elevator car 202 has not arrived at the landing 206 in which the landing call device 208 resides, when the predefined delay time has elapsed after initiating the time measuring function, the monitoring unit 102 generates at the step 620 the at least one signal indicating an out-of-operation state of the elevator system 200 to the external computing entity 106 as discussed above.

In the example of FIG. 6B, after the step 530 described above, at the step 630 the monitoring unit 102 may provide the monitored response of the elevator system 200 to the external computing entity 106. At the step 640, the external computing entity 106 may generate an indication that the elevator system 200 is out-of-operation, in response to a detection at the step 640 that the elevator system 200 is not responding to the generated elevator call in the expected manner during the predefined delay time after initiating the time measuring function as discussed above. The response of the elevator system 200 to the generated elevator call in the expected manner may be that the elevator car 202 arrives at the desired landing 206, i.e. the landing 206 in which the landing call device 208 resides from which the elevator call is generated. In other words, if the external computing entity 106 detects, at the step 640, from the received monitored response from the monitoring unit 102 that the elevator car 202 has not arrived at the desired landing 206, i.e. the landing 206 in which the landing call device 208 resides from which the elevator call is generated, when the predefined delay time has elapsed after initiating the time measuring function, the external computing entity 106 generates at the step 650 the indication that the elevator system 200 is out-of-operation as discussed above.

Figure 7:
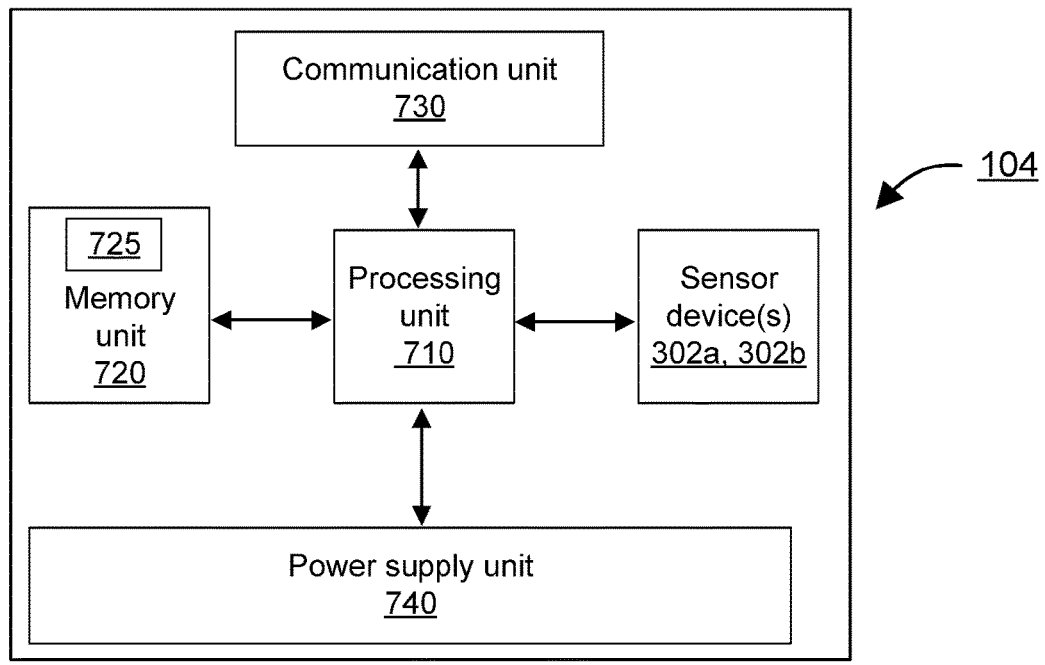
FIG. 7 schematically illustrates an example of components of a sensor unit according to the invention.

FIG. 7 illustrates schematically an example of components of the sensor unit 104. The sensor unit 104 may comprise processing unit 710 comprising one or more processors, a memory unit 720 comprising one or more memories, a communication unit 730, sensor device(s) 302, 302a, 302b, and power supply unit 740. The mentioned elements of may be communicatively coupled to each other with e.g. an internal bus. The one or more processors of the processing unit 710 may be any suitable processor for processing information and control the operation of the monitoring unit 102, among other tasks. Preferably, the processing unit 710 may be implemented as a microcontroller (MCU) with embedded software. The memory unit 720 may store portions of computer program code 725 and any other data, and the processing unit 710 may cause the sensor unit 120 to operate as described by executing at least some portions of the computer program code 725 stored in the memory unit 720. Furthermore, the one or more memories of the memory unit 720 may be volatile or non-volatile. Moreover, the one or more memories are not limited to a certain type of memory only, but any memory type suitable for storing the described pieces of information may be applied in the context of the invention. The power supply unit 740 comprises a power source, e.g. one or more batteries or capacitors, for providing power to the components of the sensor unit 104. The power supply unit 740 may further comprise power management controller and/or a power harvester, e.g. one or more solar cells, for providing power to the components of the sensor unit 104. The communication unit 730 provides an interface for communication with any external unit, such as the monitoring unit 102, and/or any external systems. The communication unit 730 may comprise one or more communication devices, e.g. radio transceiver, antenna, etc. The communication unit 730 may be based on one or more known communication technologies in order to exchange pieces of information as described earlier. As discussed above the communication unit 730 may be preferably based on one or more medium-range wireless radio frequency technologies, e.g. sub-gigahertz frequency technologies, in order to communicate with the monitoring unit 102. The sub-gigahertz frequency technology may be LoRa or any other sub-gigahertz frequency technologies.

The components of the sensor unit 104 may each be individual component or at least some of the components of the sensor unit 104 may be integrated on a single substrate or a chip, i.e. a system on a chip (SoC). For example, the microcontroller, the radio transceiver and the power management controller may be integrated in the same system on a chip.

The physical size of the sensor unit 104 may be substantially small. Preferably, the physical size of the sensor unit 104 may be such that the components of the sensor unit 104 may be arranged, i.e. fitted, inside a signalization component, i.e. an indicator element, of the elevator system 100 without increasing the physical size of the signalization component remarkably. The signalization component may be e.g. a hall lantern unit (such as hall lantern up or hall lantern down) arranged to a landing to instruct a passenger to select a correct elevator car.

Figure 8:
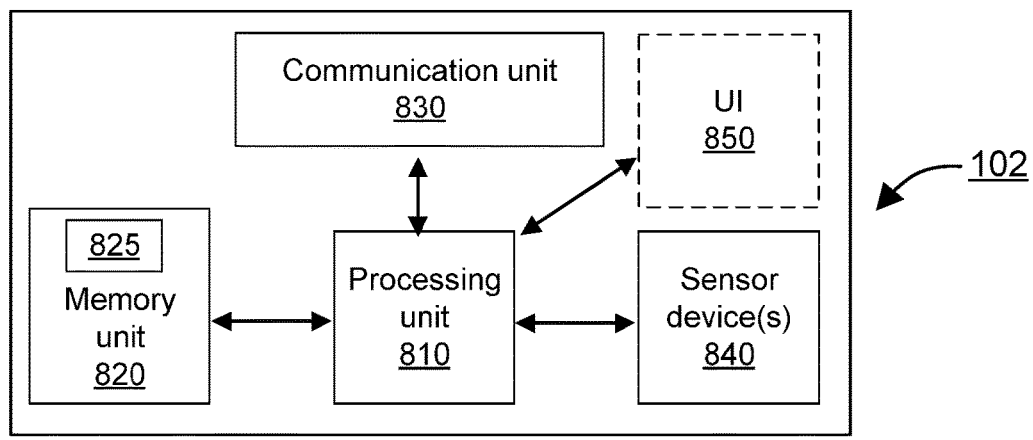
FIG. 8 schematically illustrates an example of components of a monitoring unit according to the invention.

FIG. 8 schematically illustrates an example of components of the monitoring unit 102 according to the invention. The monitoring unit 102 may comprise a processing unit 810 comprising one or more processors, a memory unit 820 comprising one or more memories, a communication unit 830 comprising one or more communication devices, one or more sensor devices 840 and possibly a user interface (UI) unit 850. The mentioned elements of may be communicatively coupled to each other with e.g. an internal bus. The one or more processors of the processing unit 810 may be any suitable processor for processing information and control the operation of the monitoring unit 102, among other tasks. The memory unit 820 may store portions of computer program code 825 and any other data, and the processing unit 810 may cause the monitoring unit 120 to operate as described by executing at least some portions of the computer program code 825 stored in the memory unit 820. Furthermore, the one or more memories of the memory unit 820 may be volatile or non-volatile. Moreover, the one or more memories are not limited to a certain type of memory only, but any memory type suitable for storing the described pieces of information may be applied in the context of the invention. The communication unit 830 may be based on at least one known communication technologies, either wired or wireless, in order to exchange pieces of information as described earlier. The communication unit 830 provides an interface for communication with any external unit, such as the sensor unit 104, the elevator control system, the external computing entity 106, database and/or any external systems. The communication unit 830 may comprise one or more communication devices, e.g. radio transceiver, antenna, etc. As discussed above the communication unit 830 may be preferably based on one or more medium-range wireless radio frequency technologies, e.g. sub-gigahertz frequency technologies, in order to communicate with the sensor unit 104. The sub-gigahertz frequency technology may be LoRa or any other sub-gigahertz frequency technologies. The one or more sensor devices 840 may comprise, e.g. accelerometer, magnetometer, gyroscope, inclinometer, pressure sensor, temperature sensor, microphone, current sensor, etc., for detecting at least one operation of the elevator system 200 and/or for providing the operational data of the elevator system 200. The user interface 850 may comprise I/O devices, such as buttons, keyboard, touch screen, microphone, loudspeaker, display and so on, for receiving input and outputting information. The power for the monitoring unit 102 may be provided from the mains via a plug or similar. Alternatively or in addition, the monitoring unit 102 may comprise a rechargeable battery for providing power to enable battery operated monitoring unit, for example in power failure situations.

The sensor unit 104 and/or the monitoring unit 102 may be implemented in any elevator system including newly installed elevator systems and already existing, i.e. operating, elevator systems. The sensor unit 104 may be retrofitted to an existing elevator system and may be completely independent of the existing elevator system. In other words, the sensor unit 104 may be arranged to already existing elevator system without communicatively coupling the sensor unit 104 to one or more entities, e.g. control units, of the existing elevator system. The sensor unit 104 may be only mechanically installed in a physical connection with the elevator system as discussed above. Alternatively or in addition, the monitoring unit 102 may be retrofitted to an existing elevator system and may be completely independent of the existing elevator system. In other words, the monitoring unit 102 may be arranged to already existing, i.e. operating, elevator system without communicatively coupling the monitoring unit 102 to one or more entities, e.g. control units, of the existing elevator system. The monitoring unit 102 may be only mechanically coupled in physical connection with the elevator system as discussed above. This enables that the system 100 according to the invention may be implemented in a newly installed elevator system or in already existing elevator system. By implementing the system 100 according to the invention in already existing elevator system monitoring of condition of already existing elevator system is enabled. Moreover, it enables that the whole system 100, the sensor unit 104, and/or the monitoring unit 102 according to the invention do not have any requirements to the elevator system. Because the system 100 comprising the sensor unit 104 and/or the monitoring unit 102 is completely independent of the elevator system, it enables that the system 100 is substantially easy to install to the elevator system 200.

Above the invention is described so that the sensor unit 104 is used for monitoring the generation of elevator calls by the passengers in order to monitor the condition of the elevator system 200. Alternatively or in addition, the sensor unit 104 according to the invention may be used for monitoring any other activity and/or operation at the landing in which the sensor unit 104 resides. For example, the sensor unit 104 may be used for monitoring condition of lighting at said landing 206 in which the sensor unit 104 resides.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A system for detecting an out-of-operation state of an elevator system, comprising:
  a monitoring unit for monitoring one or more operations of the elevator system; and
  a sensor unit arranged in a vicinity of a landing call device and configured to:
    detect at least one event indicating a generation of an elevator call; and
    provide a message indicating the generation of an elevator call to the monitoring unit, and
  wherein the monitoring unit is configured to:
    initiate a time measuring function in response to receiving the message from the sensor unit; and
    monitor a response of the elevator system to the generated elevator call.

2. The system according to claim 1, wherein the monitoring unit is further configured to generate at least one signal indicating an out-of-operation state of the elevator system to an external computing entity, in response to a detection that the elevator system is not responding to the generated elevator call in an expected manner during a predefined delay time after initiating the time measuring function.

3. The system according to claim 1, wherein the monitoring unit is further configured to provide the monitored response to the external computing entity, and the external computing entity is configured to generate an indication that the elevator system is out-of-operation, in response to a detection that the elevator system is not responding to the generated elevator call in an expected manner during a predefined delay time after initiating the time measuring function.

4. The system according to claim 1, wherein the sensor unit comprises a first sensor device for detecting a first event indicating the generation of an elevator call within a detection zone of the first sensor device, wherein the first event is one of the following: motion of an object, gesture of an object, a change in a distance between the sensor unit and a nearest detected object.

5. The system according to claim 4, wherein the sensor unit further comprises a second sensor device for detecting a second event within a detection zone of the second sensor device before detection of the first event by the first sensor device, wherein the second event is a motion of an object or gesture of an object.

6. The system according to claim 5, wherein the sensor unit is configured to wake up from a sleep mode in response to a detection of the second event by the second sensor device, and to initiate a monitoring mode of the first sensor device for a predefined monitoring period.

7. The system according to claim 4, wherein if the first event is the change in a distance between the sensor unit and a nearest detected object, the message comprises a shortest detected distance between the sensor unit and a nearest detected object, and
wherein the monitoring unit is configured to initiate the time measuring function if the received distance corresponds substantially to a reference distance range representing a distance between the sensor unit and the landing call device.

8. The system according to claim 7, wherein the reference distance range is adjusted by the monitoring unit by a continuous learning during the operation of the system or the reference distance range is pre-defined.

9. The system according to claim 1, wherein the message is provided to the monitoring unit in response to the detection of the at least one event indicating the generation of an elevator call or after a predefined monitoring period has elapsed.

10. The system according to claim 1, wherein the sensor unit is retrofitted to an existing elevator system and independent of the existing elevator system, and/or
wherein the monitoring unit is a retrofitted to an existing elevator system and independent of the existing elevator system.

11. A method for detecting an out-of-operation state of an elevator system, comprising the steps of:
detecting, by a sensor unit arranged in a vicinity of a landing call device, at least one event indicating a generation of an elevator call;
providing, by the sensor unit, a message indicating the generation of an elevator call to a monitoring unit,
initiating, by the monitoring unit, a time measuring function in response to receiving the message; and
monitoring, by the monitoring unit, a response of the elevator system to the generated elevator call.

12. The method according to claim 11, further comprising the step of generating, by the monitoring device, at least one signal indicating an out-of-operation state of the elevator system to an external computing entity, in response to a detection that the elevator system is not responding to the generated elevator call in an expected manner during a predefined delay time after initiating the time measuring function.

13. The method according to claim 11, further comprising the steps of:
providing, by the monitoring unit, the monitored response to an external computing entity for detecting an out-of-operation state of an elevator system; and
generating, by the external computing entity, an indication that the elevator system is out-of-operation, in response to a detection that the elevator system is not responding to the generated elevator call in an expected manner during a predefined delay time after initiating the time measuring function.

14. The method according to claim 11, wherein the sensor unit comprises a first sensor device for detecting a first event indicating the generation of an elevator call within a detection zone of the first sensor device, wherein the first event is one of the following: motion of an object, gesture of an object, a change in a distance between the sensor unit and a nearest detected object.

15. The method according to claim 14, wherein the sensor unit further comprises a second sensor device for detecting a second event within a detection zone of the second sensor device before detection of the first event by the first sensor device, wherein the second event is motion of an object or gesture of an object.

16. The method according to claim 15 wherein the method further comprises the steps of:
waking up the sensor unit from a sleep mode in response to a detection of the second event by the second sensor device; and
initiating a monitoring mode of the first sensor device for a predefined monitoring period.

17. The method according to claim 14, wherein if the first event is the change in a distance between the sensor unit and a nearest detected object, the message comprises a shortest detected distance between the sensor unit and a nearest detected object, wherein the method further comprises the step of initiating, by the monitoring unit, the time measuring function if the received distance corresponds substantially to a reference distance range representing a distance between the sensor unit and the landing call device.

18. The method according to claim 17, wherein the reference distance range is adjusted by the monitoring unit by a continuous learning during the operation of the system or the reference distance range is pre-defined.

19. The method according to claim 11, wherein the message is provided to the monitoring unit in response to the detection of the at least one event indicating the generation of an elevator call or after a predefined monitoring period has elapsed.

20. The system according to claim 2, wherein the sensor unit comprises a first sensor device for detecting a first event indicating the generation of an elevator call within a detection zone of the first sensor device, wherein the first event is one of the following: motion of an object, gesture of an object, a change in a distance between the sensor unit and a nearest detected object.

* * * * *